(12) United States Patent
Xiong et al.

(10) Patent No.: US 8,521,949 B2
(45) Date of Patent: Aug. 27, 2013

(54) DATA DELETING METHOD AND APPARATUS

(71) Applicant: Huawei Technologies Co., Ltd., Shenzhen (CN)

(72) Inventors: Qiang Xiong, Shenzhen (CN); Xiaohui Xiao, Folsom, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/648,852

(22) Filed: Oct. 10, 2012

(65) Prior Publication Data
US 2013/0124785 A1 May 16, 2013

Related U.S. Application Data

(63) Continuation of application No. PCT/CN2011/079385, filed on Sep. 6, 2011.

(51) Int. Cl.
*G06F 12/02* (2006.01)

(52) U.S. Cl.
USPC .......................................... 711/103; 711/154

(58) Field of Classification Search
None
See application file for complete search history.

(56) References Cited

U.S. PATENT DOCUMENTS

| | | | |
|---|---|---|---|
| 2005/0228938 A1* | 10/2005 | Khare et al. | 711/103 |
| 2006/0117136 A1* | 6/2006 | Tran et al. | 711/112 |
| 2006/0120235 A1* | 6/2006 | Jensen | 369/47.1 |
| 2007/0005659 A1* | 1/2007 | Lemoal et al. | 707/200 |
| 2009/0157948 A1* | 6/2009 | Trichina et al. | 711/103 |
| 2009/0240873 A1 | 9/2009 | Yu et al. | |
| 2010/0088461 A1 | 4/2010 | Yang et al. | |
| 2010/0122047 A1* | 5/2010 | Vasilievna et al. | 711/155 |
| 2011/0289271 A1* | 11/2011 | Nagpal et al. | 711/114 |
| 2012/0254505 A1* | 10/2012 | Chishtie et al. | 711/103 |

FOREIGN PATENT DOCUMENTS

| | | |
|---|---|---|
| CN | 101465164 A | 6/2009 |
| CN | 101562045 A | 10/2009 |
| CN | 101635020 A | 1/2010 |
| CN | 101667458 A | 3/2010 |

OTHER PUBLICATIONS

Wei et al. ("Reliably Erasing Data From Flash-Based Solid State Drives", 9th USENIX conference on File & Storage Technologies, Feb. 15-17, 2011), pp. 13.*
International Search Report issued in corresponding PCT Application No. PCT/CN2011/079385; mailed Jun. 7, 2012.
Search Report issued in corresponding Chinese Patent Application No. 201180003473.1, mailed Nov. 16, 2012.
International Search Report and Written Opinion of the International Searching Authority issued in corresponding PCT Patent Application No. PCT/CN2011/079385, mailed Jun. 7, 2012.

* cited by examiner

*Primary Examiner* — Kaushikkumar Patel
(74) *Attorney, Agent, or Firm* — Brinks Hofer Gilson & Lione

(57) ABSTRACT

A data deleting method and apparatus is provided in embodiments of this application. The method comprises: when a file system detects a delete request for a target file, examining a security property of the target file, wherein the security property of a file comprises secret classified property; if the security property of the target file is secret classified property, executing an overwrite operation on the target file and then executing a delete operation to delete the target file; wherein the overwrite operation comprises sending a write command to a SSD, the write command being a predefined write command which is expanded by adding an immediate scrubbing flag, to cause the SSD to invoke a backstage garbage collection program according to the predefined write command to immediately delete data on garbage blocks corresponding to logical block addresses of the target file.

9 Claims, 5 Drawing Sheets

DATA DELETING METHOD AND APPARATUS

CROSS-REFERENCE TO RELATED APPLICATIONS

This application is a continuation of International Application No. PCT/CN2011/079385, filed on Sep. 6, 2011, which are hereby incorporated by reference in its entirety.

TECHNICAL FIELD OF THE APPLICATION

The present application relates to the field of data delete in solid state disks, and more specifically, to a data deleting method and apparatus.

BACKGROUND

SSD (Solid State Disk) storage media are classed into two categories, one employs FLAH chips as storage medium and the other employs DRAM as storage medium. SSDs employing DRAM as storage medium require a separate power supply to protect data security, and thus have a narrow range of applications. FLASH based SSDs employ FLASH chips as storage media. One basic problem of FLASH memory is that, before data writing, erase operation must be performed on corresponding storage cells. Moreover, it is performed in a unit of block, which is larger than the basic unit of upper level logic read and write operations and also larger than the unit page of SSD internal data transmission. This characteristic may cause severe performance drop of the entire FLASH memory. Another characteristic impacting performance is that SSD storage elements have limited erase times.

For reasonable data arrangement in chips, realizing load balance, lowering loss unbalance, and improving the parallelism of storage elements, SSDs improve entire performance using FTL (Flash Translation Layer). A basic function of FTL is to maintain a mapping table of LBAs (Logical Block Addresses) to physical addresses. If a LBA requires update (to write new data into the LBA), FTL may write updated data into an unused physical address, at the same time, update the mapping table to record the new physical address corresponding to the LBA. At that point, a duplicate of data mapped by the LBA previously is still stored in an obsolete physical address that the LBA mapped to, i.e., a garbage block, waiting for collecting by a backstage garbage collection program, only after which the data is really deleted and can not be restored.

SSD data deleting method according to existing data delete techniques mainly employs the SECURITY ERASE UNIT command of the ATA (Advanced technology Attachment) command set to erase all data regions accessible to users. HD (Hard Disk) drivers write 0 or 1 to data regions through executing the SECURITY ERASE UNIT command of ATA commands to erase all data regions accessible to users. Through deleting data on a whole HD using ATA command, data on a SSD can be thoroughly deleted. However, in order to reduce the time for format, instead of deleting data in all blocks, a SSD may only release a mapping table of LBAs to physical addresses, and data to be deleted may be still stored in garbage blocks, waiting for invoking a backstage garbage collection program when I/O is idle or some deleting condition is satisfied, after that the data can be really deleted.

Existing delete methods also comprise erasing data at a specified physical address as required using general I/O commands in a software manner, particularly, through rewriting a specified LBA of a HD. If it is to delete data of a whole HD, LBAs of the whole HD will be rewritten. Data overwrite generally overwrites original data with specified and random data, perhaps, several times repeatedly. At last, data is read to confirm whether data overwriting is successful. In this way when deleting data of a whole HD, it is necessary to repeat data overwriting several times, resulting in more and more duplicates of the specified and random data left in the FTL of a SSD, however, data required to be deleted may be still stored in garbage blocks as duplicate data waiting for collecting by a backstage garbage collection program when I/O is idle or some deleting condition is satisfied, after that the data can be really deleted.

In other words, when deleting any file, none of the prior art can make sure of the immediate deleting of duplicate data of the file that may probably exist, such that data security can not be guaranteed since it is not difficult to recover a file due to the present of duplicate data.

SUMMARY APPLICATION

Embodiments of this application are used to address a problem in the prior art of unable to immediately release duplicate data of a file that may exist when deleting data.

In order to address the above problem, an embodiment of this application provides a data deleting method, comprising:

When a file system detects a delete request for a target file, examining a security property of the target file, wherein the security property of a file comprises secret classified property and general property;

if the security property of the target file is secret classified property, first, executing an overwrite operation on the target file and then executing a delete operation to delete the target file;

wherein the overwrite operation comprises sending a write command to a SSD, the write command being a predefined write command which is expanded by adding an immediate scrubbing flag, to cause the SSD to invoke a backstage garbage collection program according to the predefined write command to immediately delete data on garbage blocks corresponding to logical block addresses of the target file.

Correspondingly, an embodiment of this application also provides a data deleting apparatus, comprising:

a property determining module for When a file system detects a delete request for a target file, examining a security property of the target file, wherein the security property of a file comprises secret classified property and general property;

a deleting module for when the target file is determined as a file having secret classified property by the property determining module, executing an overwrite operation on the target file and then executing a delete operation to delete the target file;

wherein the overwrite operation comprises sending a write command to a SSD, the write command being a predefined write command which is expanded by adding an immediate scrubbing flag, to cause the SSD to invoke a backstage garbage collection program according to the predefined write command to immediately delete data on garbage blocks corresponding to logical block addresses of the target file.

The embodiments of this application may produce the following beneficial effects.

According to user security requirement on a target file, when the target file is detected, it is possible to execute an overwrite operation on the target file according to a expanded predefined write command to invoke a backstage garbage collection program to immediately delete garbage blocks in a SSD on which duplicate data of the target file may be probably stored, so that thorough deleting of the target file can be realized, invalid data recovery of the target file can be avoided, and data security of the target file can be guaranteed; furthermore, at the time of storing and updating, storage operations are always performed on the target file according to the special expanded write command, which may further guarantee data security of the target file.

BRIEF DESCRIPTION OF THE DRAWINGS

For a more explicit description of the technical solutions of embodiments of this application, a brief introduction of accompanying drawings to be used in the description of these embodiments will be given below. Obviously, accompanying drawings described below are merely some embodiments of this application, for those skilled in the art, other accompanying drawings can be derived from these ones without any creative efforts.

DETAILED DESCRIPTION

A clear and complete description of technical solutions of embodiments of this application will be given with reference to the accompanying drawings of the embodiments of this application. Obviously, embodiments described herein are merely some embodiments of this application, but not all of them. Based on those embodiments of this application, other embodiments can occur to those skilled in the art without any creative efforts, all of which fall within the scope of this application.

For a file specified as a file having secret classified property by a user, mainly using an expanded write command, in storage and deleting processes of the file, embodiments of this application can cause a SSD to immediately invoke a backstage garbage collection program to find out garbage blocks of stored data associated with the file and then erase data on those garbage blocks.

Figure 1:
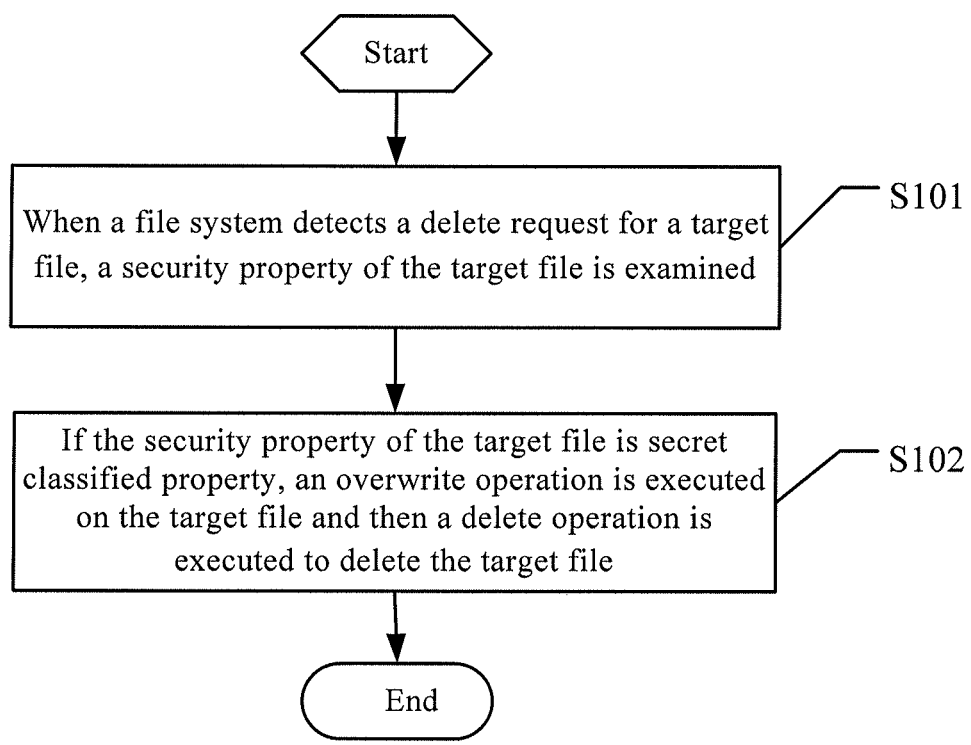
FIG. 1 is a schematic flowchart of a data deleting method according to a first embodiment of this application.

Referring to FIG. 1, FIG. 1 is a schematic flowchart of a data deleting method according to a first embodiment of this application, the deleting method comprises the following steps.

S101: When a file system detects a delete request for a target file, a security property of the target file is examined, wherein the security property of a file comprises secret classified property and general property.

When it is required to delete a file, first of all, a security property of the target file is examined. If the file has secret classified property, representing that a user has paid attention to data security of the target file, and thus data of the target file need to be deleted thoroughly and S102 will be executed; otherwise, if it is a file with other kinds of security property, such as a general property file or a file without a secret classified property flag, it will be deleted according to an existing deleting method.

Particularly, prior to S101, there are three manners to specify a target file as a file having a security property of secret classified property and store it on a SSD.

The security property of a target file is specified to secret classified property; the target file is stored on a SSD; when a write operation to the target file is detected, data is written, that is, stored on the SSD according to the predefined write command.

First of all, a logic disk having a security property of secret classified property is provided, the write command corresponding to the logical disk having secret classified property is the predefined write command; then, the target file is stored on the logic disk having a security property of secret classified property, so that the target file has a security property of secret classified property; when a write operation to the target file is detected, data is written, that is, stored on the SSD according to the specified write command.

If the target file is a general file, the security property of the target file is changed to secret classified property; after having been changed to secret classified property, it is also necessary to immediately scrub one or more garbage blocks of duplicate data of the file that may probably exist when the target file is a general file, so as to guarantee data security of the target file, through: sending a control command to the SSD to cause the SSD to invoke a backstage garbage collection program to immediately scrub garbage blocks satisfying a preset immediate scrubbing condition; when a write operation to the target file is detected, writing, that is, storing data on the SSD according to the specified write command; wherein SSD to invoke a backstage garbage collection program to immediately scrub garbage blocks satisfying a preset immediate scrubbing condition comprises: according to current LBAs of the target file, traversing reverse-mapping tables corresponding to all garbage blocks to determine garbage blocks satisfying a preset immediate scrubbing condition; invoking a backstage garbage collection program to immediately scrub garbage blocks that have been determined as satisfying the preset immediate scrubbing condition.

The security property of a target file can be set to secret classified property through any manner described above, so that in the subsequent deleting of the target file, duplicate data corresponding to the target file that may probably exist can be immediately deleted to thoroughly delete all data.

S102: If the security property of the target file is secret classified property, an overwrite operation is executed on the target file and then a delete operation is executed to delete the target file. Wherein, the overwrite operation comprises sending a write command to a SSD, the write command being a predefined write command which is expanded by adding an immediate scrubbing flag, to cause the SSD to invoke a backstage garbage collection program according to the predefined write command to immediately delete data on garbage blocks corresponding to logical block addresses of the target file.

Particularly, when the target file to be deleted is a file having secret classified property, a file system may first perform an overwrite operation to the target file, that is, write invalid data to logical block addresses of the target file, for example, all "0" or all "1" to overwrite data of the target file.

When writing such invalid data to logical blocks of the target file and storing those invalid overwritten data to data blocks by the SSD, those overwritten data may probably not be stored to data blocks having physical addresses corresponding to those logical block addresses to overwrite data of the target file, instead, new data blocks may be allocated for those overwritten data, and the physical addresses of the new data blocks are correspondingly associated with the logical block addresses of the target file, data block storing data of the target file previously then become garbage blocks and are put into a queue for garbage collection waiting for collecting by a backstage garbage collection program, and data stored on the garbage blocks is duplicate data of the target file. Wherein, a data block refers to a storage area storing the target file of the physical storage device of the SSD, the address of which is represented by a unique physical address; a logical block refers to a virtual storage area corresponding to a data block, and a logical block address is used to represent a virtual address of each virtual storage area; the correspondence is generally represented by "mapping", which may be called as "mapping logical blocks to data blocks" or "mapping data blocks to logical blocks" vice versa. Due to this correspondence, when it is required to perform various operations on data blocks, various operations can be performed on logical block addresses to realize operations on data blocks corresponding to the logical blocks. Such "mapping" techniques are well known by those skilled in the art and will not be describe in detail herein.

In the overwrite operation performed on the target file at S102, the write command sent to the SSD through a HD driver is a predefined write command, which is a write command that is expanded by adding an immediate scrubbing flag, and the immediate scrubbing flag is set when the predefined write command is sent to the SSD, such that after the SSD stores invalid data according to the predefined write command, a backstage garbage collection program is invoked to immediately find out garbage blocks storing duplicate data of the target file according to logical block addresses of the target file and scrub data on the garbage blocks, so that data of the target file is thoroughly deleted, and data security of the target file is guaranteed.

Wherein, before the SSD invokes a backstage garbage collection program according to the predefined write command to immediately find out garbage blocks storing duplicate data of the target file and scrub data on the garbage blocks, the method comprises: the SSD parses the corresponding write command corresponding to the target file; if a immediate scrubbing flag is included and set in the write command, executing the step of the SSD invokes a backstage garbage collection program according to the predefined write command to immediately find out garbage blocks storing duplicate data of the target file and scrub data on the garbage blocks.

A file system may execute multiple times of overwrite, after the execution of overwrite operations, it is necessary for the file system to perform an operation of deleting the target file so as to complete the secure deleting of the file. Further, the delete operation is an operation at the file system level, which can be realized in the prior art and will not be repeated herein.

After executing the overwrite operation to the target file and the delete operation to the target file at S102, the target file is thoroughly deleted.

The predefined write command comprises: a write command that is expanded with an immediate scrubbing flag using an obsolete bit or a reserved bit of a write command of the ATA command set; or a write command that is expanded with an immediate scrubbing flag using an obsolete bit or a reserved bit of a write command of the SCSI (Small Computer System Interface) command set; or a write command that is expanded with an immediate scrubbing flag using an obsolete bit or a reserved bit of a write command of the NVMHCI (Non-Volatile Memory Host Controller Interface) command set.

An ATA write command comprises an obsolete bit or a reserved bit, an ATA write command, that is, a WRITE SECTOR (S) command is shown in Table 1. The sense of the ATA write command can be expanded with the obsolete 1 bit (7:5 of the Device) or the reserved bit (3:0 of the Device), that is, by adding an immediate scrubbing flag.

TABLE 1

| NAME | Description |
| --- | --- |
| Feature | N/A |
| Count | The number of logical sectors to be transferred. A value of 00h indicates that 256 logical sectors are to be transferred |
| LBA | LBA of first logical sector to be transferred |
| Device | Bit Description |
|  | 7:5 Obsolete |
|  | 4 Transport Dependent |
|  | 3:0 Reserved |
| Command | 7:0 30h |

After adding an immediate scrubbing flag in an obsolete/reserved bit of the WRITE SECTOR (S) command of the ATA command set, in storage, updating and deleting processes of a target file having a secret security property, the file system always cause the SSD to invoke a backstage garbage collection program through this command to immediately find out garbage blocks probably storing duplicate data of the target file and scrub data on the garbage blocks to thoroughly delete the target file having secret classified property.

A SCSI write command may also comprise a reserved bit. A SCSI write command, that is, write (10) is shown in Table 2. The sense of the SCSI write command can be expanded with the reserved 1 bit, that is, by adding an immediate scrubbing flag.

TABLE 2

| Byte | Bit | | | | | | | |
| --- | --- | --- | --- | --- | --- | --- | --- | --- |
|  | 7 | 6 | 5 | 4 | 3 | 2 | 1 | 0 |
| 0 | OPERATION CODE (2Ah) | | | | | | | |
| 1 | WRPROTECT | | DPO | FUA | Reserved | FUA_NV | | Obsolete |
| 2 | LOGICAL BLOCK ADDRESS | | | | | | | |
| 5 |  | | | | | | | |
| 6 | Reserved | | | GROUP NUMBER | | | | |
| 7 | TRANSFER LENGTH | | | | | | | |
| 8 |  | | | | | | | |
| 9 | CONTROL | | | | | | | |

After adding an immediate scrubbing flag in a reserved bit of the write (10) command of the SCSI command set, in storage, updating and deleting processes of a target file having a secret security property, the file system always cause the SSD to invoke a backstage garbage collection program through this command to immediately find out garbage blocks probably storing duplicate data of the target file and scrub data on the garbage blocks to thoroughly delete the target file having secret classified property.

There are some bits reserved in the NVMHCI write command, which can be used to expand the sense of the NVMHCI write command. Table 3 is the write command of the NVMHCI standard, and a reserved bit of the write command, such as bit 15 of the command, can be used to add an immediate scrubbing flag as an expansion.

TABLE 3

| Name | 31 | 23 | 15 | 7 |
|---|---|---|---|---|
| Command | Timeout | Reserved | W   A   T | |
| Address Low | | Starting Sector Address, lower 32-bits | | |
| Address High | | Starting Sector Address, upper 32-bits | | |
| Transfer Count | Reserved | | Number of Sectors | |
| Attributes | | Command Attributes | | |

After adding an immediate scrubbing flag in the NVMHCI write command, in storage, updating and deleting processes of a target file having secret security property, the file system always cause the SSD to invoke a backstage garbage collection program through this command to immediately find out garbage blocks probably storing duplicate data of the target file and scrub data on the garbage blocks to thoroughly delete the target file having secret classified property.

It can be known from the description of the above embodiment that this application has the following advantages.

According to user security requirement on a target file, when deleting the target file, an overwrite operation can be executed on the target file according to a special expanded write command to invoke a backstage garbage collection program to immediately scrub garbage blocks probably existing in a SSD on which duplicate data of the target file are stored, so that thorough deleting of the target file can be realized, invalid data recovery of the target file can be avoided, and data security of the target file can be guaranteed; furthermore, in storing and updating processes, storage operations are always performed on the target file according to the special expanded write command, which may further guarantee data security of the target file.

Figure 2:
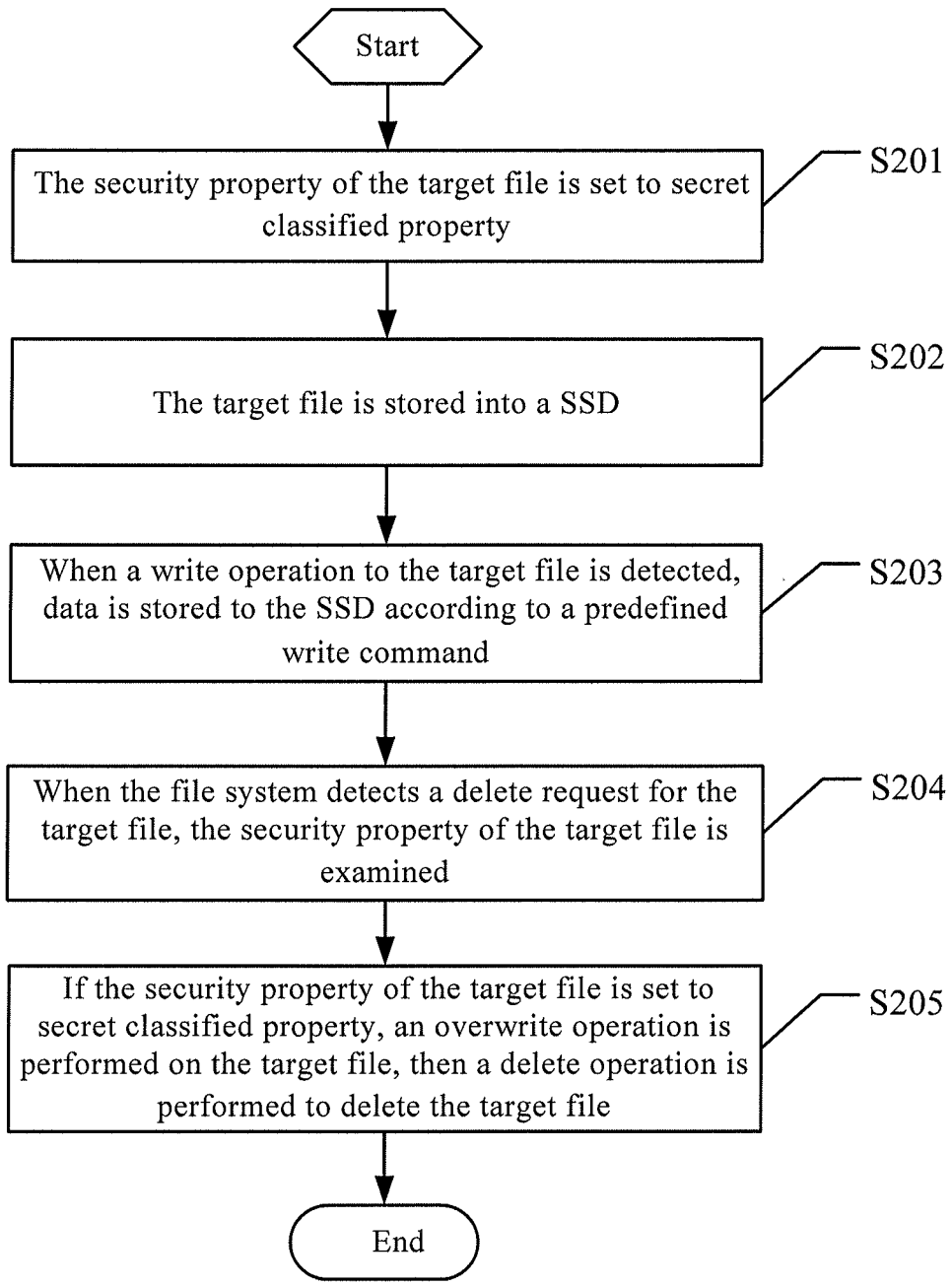
FIG. 2 is a schematic flowchart of a data deleting method according to a second embodiment of this application.

Further referring to FIG. 2, FIG. 2 is a schematic flowchart of a data deleting method according to a second embodiment of this application. The data deleting method of this embodiment comprises the following steps.

S201: The security property of the target file is set to secret classified property.

In order to make sure the data security of a target file, a user can set a security property of the target file to secret classified data through a file system when the target file is stored, so that when the target file is deleted later, the file system may invoke a backstage garbage collection program through a SSD to immediately delete duplicate data of the target file that may probably exist.

S202: The target file is stored on a SSD.

S203: When a write operation to the target file is detected, data is stored to the SSD according to a predefined write command.

When the target file is stored after the file system has update data of the target file, i.e., a write operation to the target file, logical block addresses allocated to the updated target file by the file system are unchanged, when the SSD writes data of the target file into data blocks, it may probably not be written into original data blocks storing the data of the target file, instead, a new data block may be allocated to store the data of the target file, and the original data blocks storing the target file may become garbage blocks. At this point, the file system storing the target file needs to control the SSD to immediately scrub those garbage blocks, particularly through the following steps.

The file system sends the predefined write command and logical block addresses to the SSD through the HD driver, wherein when the predefined write command is sent, an immediate scrubbing flag is set therein, the predefined write command is a write command which is expanded through adding an immediate scrubbing flag; the SSD parses the predefined write command and determines that the immediate scrubbing flag has been set in the predefined write command, then invokes a backstage garbage collection program to collect garbage blocks corresponding to the logical block addresses. As such, garbage blocks of the target file are scrubbed.

S204: When the file system detects a delete request for the target file, the security property of the target file is examined.

S205: If the security property of the target file is set to secret classified property, an overwrite operation is performed on the target file, then a delete operation is performed to delete the target file; wherein the overwrite operation comprises sending a write command to the SSD, a predefined write command which is expanded by adding an immediate scrubbing flag, to cause the SSD to invoke a backstage garbage collection program according to the predefined write command to immediately delete data on garbage blocks corresponding to logical block addresses of the target file.

It can be known from the description of the above embodiment that this application has the following advantages.

According to user security requirement on a target file, when deleting the target file, an overwrite operation can be executed on the target file according to a special expanded write command to invoke a backstage garbage collection program to immediately scrub a garbage block probably existing in a SSD on which duplicate data of the target file is stored, so that thorough deleting of the target file can be realized, invalid data recovery of the target file can be avoided, and data security of the target file can be guaranteed; furthermore, in storing and updating processes, storage operations are always performed on the target file according to the special expanded write command, which may further guarantee data security of the target file.

Figure 3:
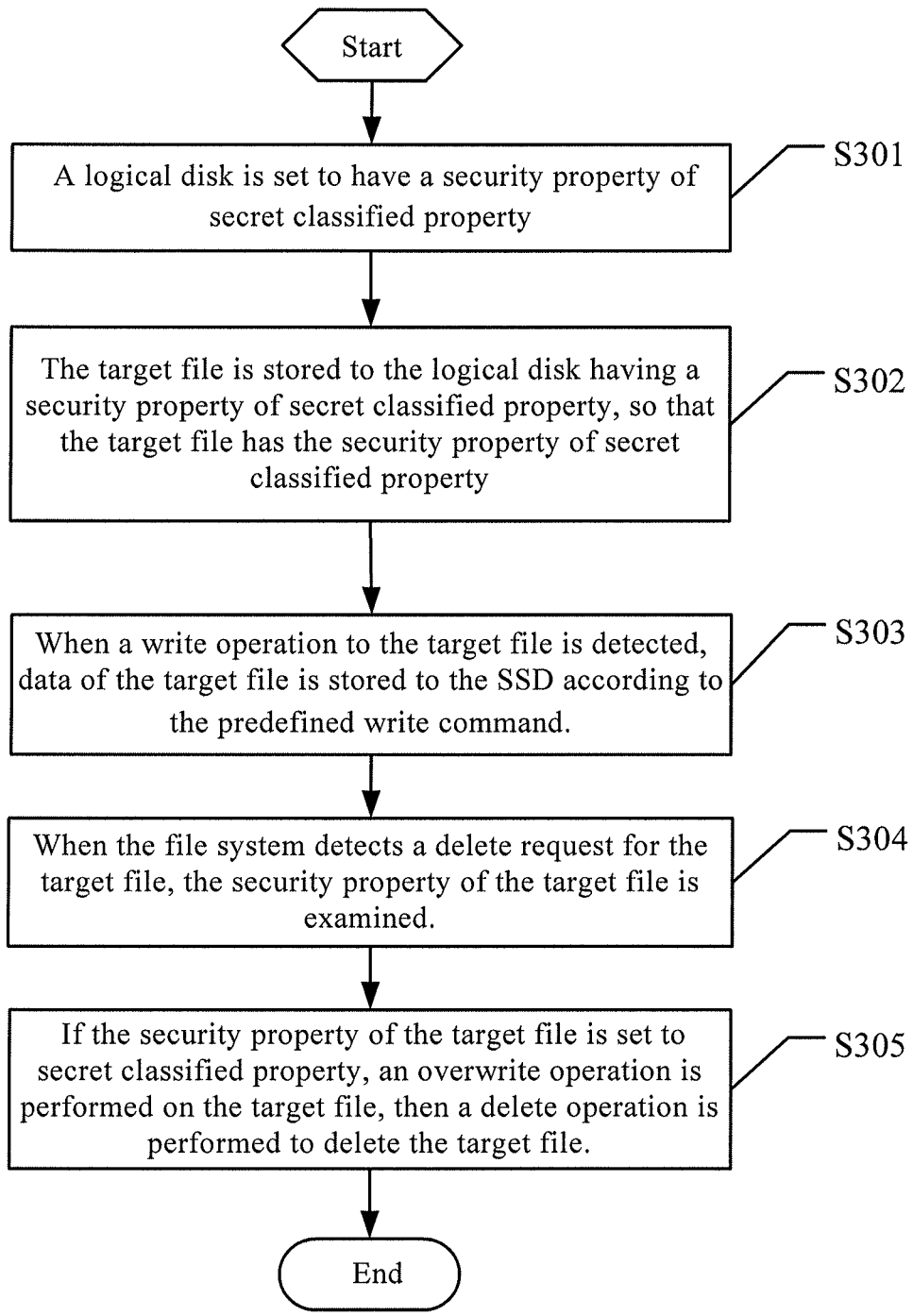
FIG. 3 is a schematic flowchart of a data deleting method according to a third embodiment of this application.

Further referring to FIG. 3, FIG. 3 is a schematic flowchart of a data deleting method according to a third embodiment of this application. The data deleting method of this embodiment comprises the following steps.

S301: A logical disk is set to have a security property of secret classified property, such that the write command corresponding to the logical disk having secret classified property is a predefined write command.

In order to make ensure the data security of a target file and facilitate the management of those files having secret classified property, a user may particularly set a logical disk through a file system as a logical disk having secret classified property. When storing files to the logical disk having secret classified property, the write command of the file system to store the files is always the predefined write command, so that garbage blocks associated with logical block addresses of those files are scrubbed when those file are stored.

S302: The target file is stored to the logical disk having a security property of secret classified property, so that the security property of the target file is set to secret classified property.

S303: When a write operation to the target file is detected, data of the target file is stored to the SSD according to the predefined write command.

After a user has update data of the target file through the file system, when the target file is stored, logical block addresses allocated to the updated target file by the file system are unchanged. When the SSD writes data of the target file into data blocks, it may probably not be written into data blocks originally storing the data of the target file, instead, new data blocks may be allocated to store the data of the target file, and the data blocks originally storing the target file may become garbage blocks. At this point, the file system storing the target file needs to control the SSD to immediately scrub those garbage blocks, particularly through the following steps.

The file system sends the predefined write command and logical block addresses to the SSD through a HD driver, wherein when the predefined write command is sent, an immediate scrubbing flag is set therein, the predefined write command is a write command which is expanded through adding an immediate scrubbing flag; the SSD parses the predefined write command and determines that the immediate scrubbing flag has been set in the predefined write command, then invokes a backstage garbage collection program to collect garbage blocks corresponding to the logical block addresses. As such, garbage blocks of the target file are scrubbed.

S304: When the file system detects a delete request for the target file, the security property of the target file is examined, wherein the security property of the file includes secret classified property.

S305: If the security property of the target file is set to secret classified property, an overwrite operation is performed on the target file, then a delete operation is performed to delete the target file; wherein the overwrite operation comprises sending a write command to the SSD, a predefined write command which is expanded by adding an immediate scrubbing flag, to cause the SSD to invoke a backstage garbage collection program according to the predefined write command to immediately delete data on garbage blocks corresponding to the logical block addresses of the target file.

It can be known from the description of the above embodiment that this application has the following advantages.

According to user security requirement on a target file, when deleting the target file, an overwrite operation can be executed on the target file according to a special expanded write command to invoke a backstage garbage collection program to immediately scrub a garbage block probably existing in a SSD on which duplicate data of the target file is stored, so that thorough deleting of the target file can be realized, invalid data recovery of the target file can be avoided, and data security of the target file can be guaranteed; furthermore, in storing and updating processes, storage operations are always performed on the target file according to the special expanded write command, which may further guarantee data security of the target file.

Figure 4:
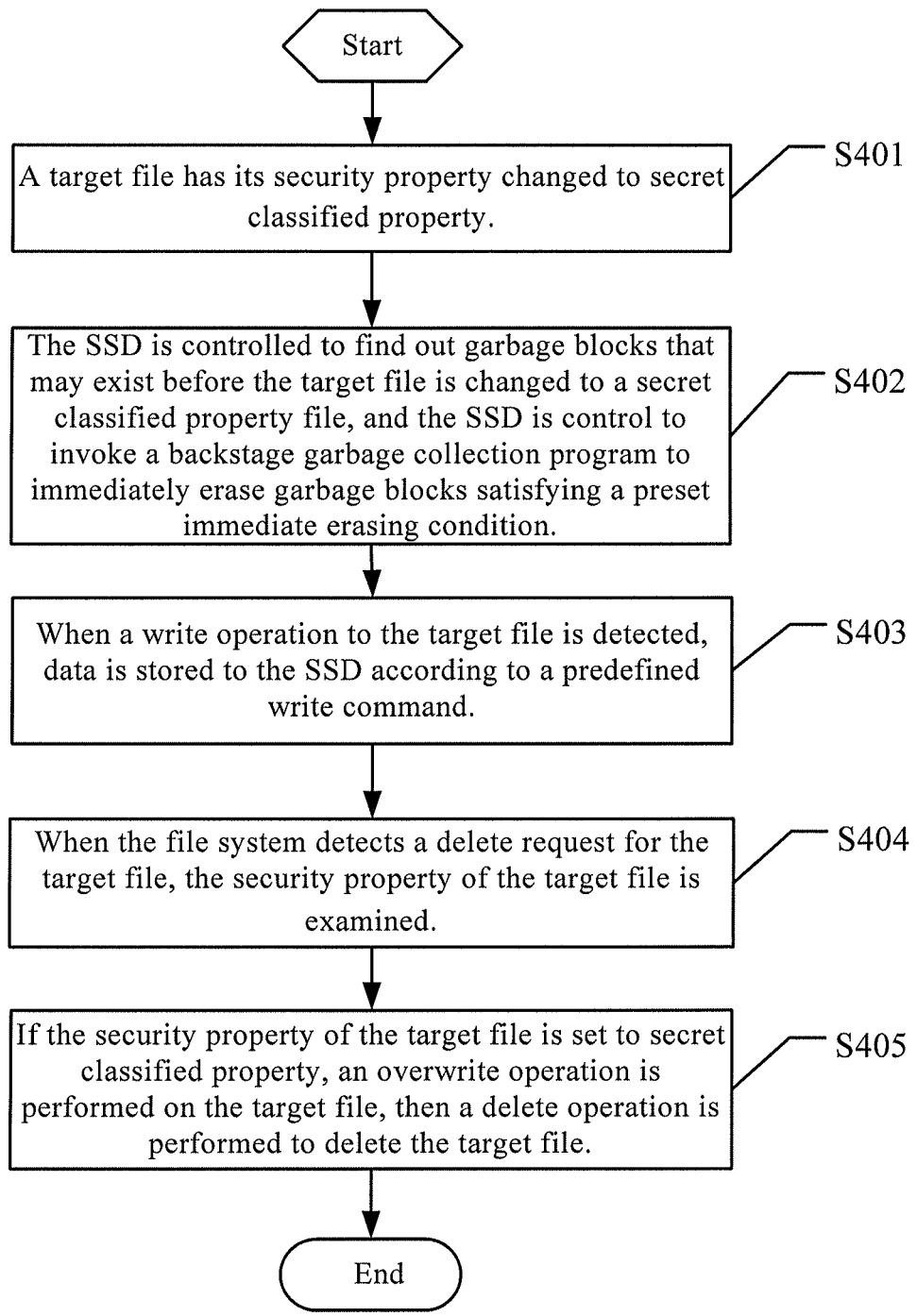
FIG. 4 is a schematic flowchart of a data deleting method according to a fourth embodiment of this application.

Further referring to FIG. 4, FIG. 4 is a schematic flowchart of a data deleting method according to a fourth embodiment of this application. The data deleting method of this embodiment comprises the following steps.

S401: A target file has its security property changed to secret classified property.

If a user wants to thoroughly delete a target file which is a general file, the security property of the target file can be changed to secret classified property, so that the target file can be thoroughly deleted according the process steps of secret classified property files.

The user may directly change the security property of the target file to secret classified property, or may transmit the target file from a general logical disk to a logical disk having secret classified property to set the security property of the target file to secret classified property.

S402: The SSD is controlled to find out garbage blocks that may exist before the target file is changed to a file having secret classified property, and the SSD is controlled to invoke a backstage garbage collection program to immediately scrub garbage blocks satisfying a preset immediate scrubbing condition.

Wherein the SSD invokes a backstage garbage collection program to immediately scrub garbage blocks satisfying a preset immediate scrubbing condition comprises: according to current logical block addresses of the target file, traversing reverse-mapping tables corresponding to all garbage blocks, which comprises mappings between physical addresses of those garbage blocks to logical block addresses before they become garbage blocks, to determine garbage blocks satisfying a preset immediate scrubbing condition; invoking a backstage garbage collection program to immediately scrub garbage blocks that have been determined as satisfying the preset immediate scrubbing condition.

Since modifying, updating processes and the like to the target file as it is a general file may cause one or more garbage blocks storing data of the target file in the SSD, after the target file has been changed to a file having secret classified property from a general file, it is necessary to clean garbage blocks that may store duplicate data of the target file when it is a general file. Those garbage blocks are scrubbed as follows.

The file system may send a command to the SSD through a HD driver to control the SSD to find out garbage blocks that may exist when the target file is a general file. The command may be a new added ATA command or a SCSI command, which may be defined as shown in Table 4.

TABLE 4

| Operation Code | Miscellaneous CDB | LBA | Scrubbing Length | Control information |
| --- | --- | --- | --- | --- |

After receiving the command, the SSD searches reverse-mapping tables corresponding to all garbage blocks, and determines garbage blocks satisfying a preset immediate scrubbing condition according to the reverse-mapping tables of all garbage blocks. The condition evaluated by the SSD of whether a garbage block will be immediately scrubbed may be: reverse LBA+block size<=LBA reverse LBA>=LBA+Scrubbing Length. Once the reverse-mapping address stored in a garbage block satisfies the condition, the garbage block meets the preset immediate scrubbing condition, and the SSD will invoke the backstage garbage collection program to immediately scrub data on the garbage block, ensuring that all garbage blocks corresponding to the target file that have stored duplicate data of the target file are scrubbed, so that data security of the target file is guaranteed.

S403: When a write operation to the target file is detected, data is stored to the SSD according to a predefined write command.

After a user has updated data of the target file through the file system, when the target file is stored, logical block addresses allocated to the updated target file by the file system are unchanged. When the SSD writes data of the target file into data blocks, it may probably not be written into data blocks originally storing the data of the target file, instead, new data blocks may be allocated to store the data of the target file, and the data blocks originally storing the target file may become garbage blocks. At this point, the file system storing the target file needs to control the SSD to immediately scrub those garbage blocks, particularly through the following steps.

The file system sends the predefined write command and logical block addresses to the SSD, wherein when the predefined write command is sent, an immediate scrubbing flag is set therein, the predefined write command is a write command which is expanded through adding an immediate scrubbing flag; the SSD parses the predefined write command and determines that the immediate scrubbing flag has been set in the predefined write command, then invokes a backstage garbage collection program to collect garbage blocks corresponding to the logical block addresses. As such, garbage blocks of the target file are scrubbed.

S404: When the file system detects a delete request for the target file, the security property of the target file is examined, wherein the security property of a file comprises secret classified property and general property.

S405: If the security property of the target file is set to secret classified property, an overwrite operation is performed on the target file, then a delete operation is performed to delete the target file;

wherein the write command sent to the SSD in the overwrite operation is a predefined write command, which is expanded by adding an immediate scrubbing flag, to cause the SSD to invoke a backstage garbage collection program according to the predefined write command to immediately delete data on garbage blocks corresponding to the logical block addresses of the target file.

It can be known from the description of the above embodiment that this application has the following advantages.

According to user security requirement on a target file, when deleting the target file, an overwrite operation can be executed on the target file according to a special expanded write command to invoke a backstage garbage collection program to immediately scrub a garbage block probably existing in a SSD on which duplicate data of the target file is stored, so that thorough deleting of the target file can be realized, invalid data recovery of the target file can be avoided, and data security of the target file can be guaranteed; furthermore, in storing and updating processes, storage operations are always performed on the target file according to the special expanded write command, which may further guarantee data security of the target file.

Below, a data deleting apparatus according to this application will be described in detail.

Figure 5:
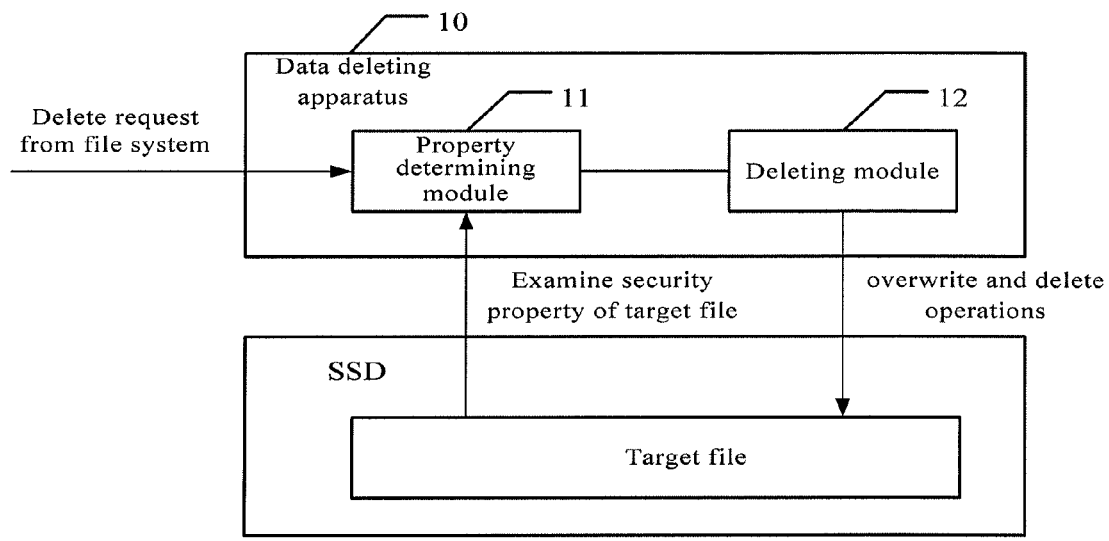
FIG. 5 is a schematic structure diagram of a data deleting apparatus according to the first embodiment of this application.

Referring to FIG. 5, FIG. 5 is a schematic structure diagram of a data deleting apparatus according to the first embodiment of this application. The data deleting apparatus 10 of this embodiment particularly comprises: a property determining module 11 and a deleting module 12.

The property determining module 11 is used to examine a security property of the target file when a delete request for a target file is detected by a file system, wherein the security property of a file comprises secret classified property and general property.

Particularly, when a file needs to be deleted, the property determining module 11 needs to examine a security property of the target file first. If it is a file having secret classified property, representing that data security of the target file is concerned by a user, data of the target file must be deleted thoroughly; otherwise, if it is a file with other kinds of security property, such as a general file or a file without a secret classified property flag, it will be deleted according to an existing deleting method, and the property determining module 11 does not perform any operation.

The deleting module 12 is used to perform an overwrite operation to the target file when the property determining module 11 determines that the target file is a file having secret classified property, and then perform a delete operation to delete the target file. Wherein the write command sent to a SSD by the deleting module 12 when performing the overwrite operation is a predefined write command, which is expanded by adding an immediate scrubbing flag, to cause the SSD to invoke a backstage garbage collection program according to the predefined write command to immediately delete data on garbage blocks corresponding to the logical block addresses of the target file.

Particularly, when a target file needing to be deleted is a file having secret classified property, the deleting module 12 may execute an overwrite operation to the target file, that is, overwriting data of the target file through writing invalid data such as all "0" or all "1" to logical block addresses of the target file.

As to writing such invalid data to logical block addresses of the target file, when the SSD stores those invalid overwritten data to data blocks, those overwritten data may probably not be stored to data blocks having physical addresses corresponding to those logical block addresses to overwrite data of the target file, instead, new data blocks may be allocated for those overwritten data, and physical addresses of the new data blocks are correspondingly associated with the logical block addresses of the target file, data blocks storing data of the target file previously then become garbage blocks and are put into a queue for garbage collection waiting for collecting by a backstage garbage collection program, data stored on the garbage blocks is duplicate data of the target file.

Thus, in the overwrite operation performed on the target file, the write command sent to the SSD through a HD driver by the deleting module 12 is a predefined write command, a write command which is expanded by adding an immediate scrubbing flag, and the immediate scrubbing flag is set when the predefined write command is sent to the SSD, such that after the SSD stores invalid data according to the predefined write command, a backstage garbage collection program is invoked to immediately find out garbage blocks storing duplicate data of the target file according to logical block addresses of the target file and scrub data on the garbage blocks, so that data of the target file is thoroughly deleted, and data security of the target file is guaranteed.

The deleting module 12 may execute multiple times of overwrite, after the execution of overwrite operations, it is necessary for the file system to perform an operation of deleting the target file so as to complete secure deletion of the file.

As to the predefined write command, it can be derived by expanding a write command for controlling the operation of a SSD in the present ATA, SCSI or NVMHCI command set.

Figure 6:
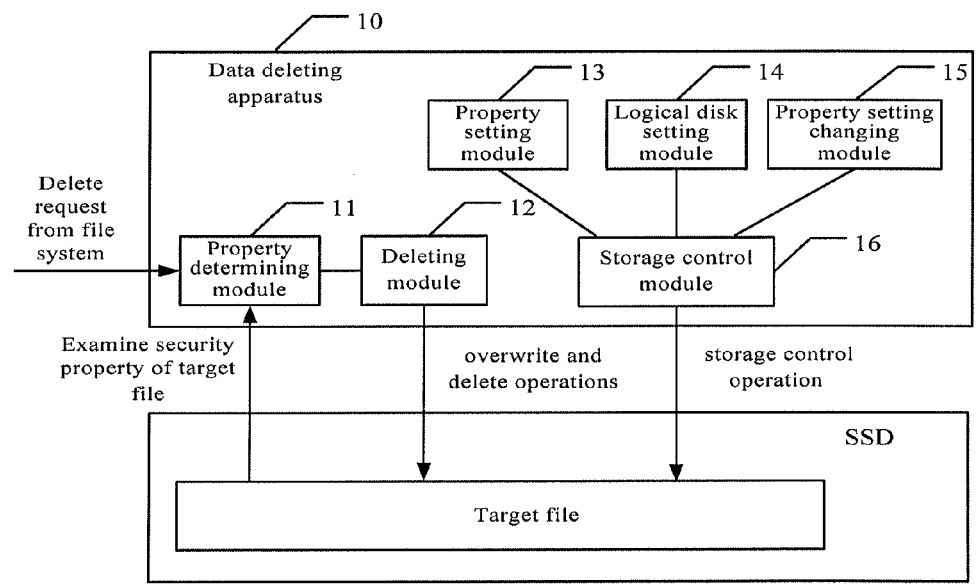
FIG. 6 is a schematic structure diagram of a data deleting apparatus according to the second embodiment of this application.

Further, referring to FIG. 6, FIG. 6 is a schematic structure diagram of a data deleting apparatus according to the second embodiment of this application. The data deleting apparatus 10 of this embodiment comprises the property determining module 11 and the deleting module 12 of the first embodiment. In this embodiment, the data deleting apparatus 10 further comprises: a property setting module 13, a logical disk setting module 14, a property setting changing module 15, and a storage control module 16.

In order to guarantee the data security of a target file, when storing the target file, a user can set a security property of the target file to secret classified property using the property setting module 13. After being set to a file having secret classified property, the target file is stored to a SSD by the storage control module 16.

The property setting module 13 is used to set the security property of the target file to secret classified property.

The storage control module 16 is used to store the target file having secret classified property to the SSD according to the predefined write command, and set an immediate scrubbing flag in the predefined write command. When storing the target file, the storage control module 16 may allocate unused logical block addresses for the target file, and store the target file having secret classified property to data blocks corresponding to physical addresses that the logical block addresses are mapped to.

In order to guarantee the data security of files and facilitate the management of secret classified property files, a user may set a logical disk using the logical disk setting module 14 as a logical disk having secret classified property. When a user wants to store a target file as a file having secret classified property, the target file can be stored to the logical disk having secret classified property by the storage control module 16 to turn the target file into a file having secret classified property to guarantee data security of the target file.

The logical disk setting module 14 is used to set a logical disk having a security property of secret classified property, the write command corresponding to the logical disk having secret classified property is the predefined write command.

The storage control module 16 is further used to store the target file on the logical disk having secret classified property according to the predefined write command, and set an immediate scrubbing flag in the predefined write command, so that the target file has a security property of secret classified property.

The storage control module 16 allocates logical block addresses to the target file; issues a storage request with logical block addresses to a HD driver, and sends the predefined write command and the logical block addresses to a SSD through the HD driver, and sets the immediate scrubbing flag in the predefined write command, wherein the predefined write command is a write command which is expanded through adding an immediate scrubbing flag; the SSD parses the predefined write command to determine that the immediate scrubbing flag in the predefined write command has been set, invokes a backstage garbage collection program to collect garbage blocks corresponding to the logical block addresses. So that, the logical block addresses of the target file having secret classified property merely correspond to data blocks storing the data of that target file.

If a user wants to set a general file to a file having secret classified property or it is required to thoroughly delete a target file which is a general file, the general target file can be changed to a file having secret classified property by the property setting changing module 15, and the storage of the target file will be controlled by the storage control module 16.

The property setting changing module 15 is used to change the security property of the target file to secret classified property.

The storage control module 16 is used to control the SSD to find out garbage blocks existing before the target file is changed to a file having secret classified property, and control the SSD to invoke a backstage garbage collection program to immediately scrub garbage blocks satisfying a preset immediate scrubbing condition.

Wherein the SSD invokes a backstage garbage collection program to immediately scrub garbage blocks satisfying a preset immediate scrubbing condition comprises: according to current logical block addresses of the target file, traversing reverse-mapping tables corresponding to all garbage blocks to determine garbage blocks satisfying a preset immediate scrubbing condition; invoking a backstage garbage collection program to immediately scrub garbage blocks that have been determined as satisfying the preset immediate scrubbing condition.

Further, as shown in FIG. 5, the storage control module 16 of the data deleting apparatus is used to control the storage of the target file, when a target file having secret classified property is updated.

The storage control module 16 is used to store data on the SSD according to the predefined write command, when a write operation to the target file is detected.

After a user has updated data of the target file, when the target file is stored, logical block addresses allocated to the updated target file by the file system are unchanged. When the SSD writes data of the target file into data blocks, it may probably not be written into data blocks originally storing the data of the target file, instead, new data blocks may be allocated to store the data of the target file, and the data blocks originally storing the target file may become garbage blocks. At this point, the storage control module 16 sends an expanded predefined write command in which an immediate scrubbing flag is added and the logical block addresses to the SSD through a HD driver, and sets the immediate scrubbing flag therein when the predefined write command is sent; the SSD parses the predefined write command to determine that the immediate scrubbing flag in the predefined write command has been set, invokes a backstage garbage collection program to collect garbage blocks corresponding to the logical block addresses. So that, garbage blocks of the target file are deleted.

It can be known from the description of the above embodiment that this application has the following advantages.

According to user security requirement on a target file, when the target file is deleted, an overwrite operation can be executed on the target file according to a special expanded write command to invoke a backstage garbage collection program to immediately scrub a garbage block probably existing in a SSD on which duplicate data of the target file is stored, so that thorough deleting of the target file can be realized, invalid data recovery of the target file can be avoided, and data security of the target file can be guaranteed; furthermore, in storing and updating processes, storage operations are always performed on the target file according to the special expanded write command, which may further guarantee data security of the target file.

Those ordinary skilled in the art may understand that all or part steps of the above method embodiments can be implemented by program instruction relevant hardware, the program described above can be stored in a computer readable storage medium, which when executed may perform steps contained in the above method embodiments. The storage medium described above may comprise: a magnetic disc, an optical disc, ROM (Read-Only memory), RAM (Random Access memory), etc.

The description above is merely some preferable embodiments of this application, which certainly is not intended to limit the scope of this application. Thus, equivalent variations made according to the claims of this application are still covered in the scope of this application.

What is claimed is:
1. A method for deleting data, comprising:
  detecting, by a file system, a delete request for a target file that is stored on a solid-state disk (SSD);
  if the delete request is detected, examining a security property of the target file, wherein the security property of a file comprises a secret classified property;
  if the security property of the target file comprises the secret classified property:
    executing an overwrite operation on the target file, and executing a delete operation to delete the target file;
    wherein during the overwrite operation, the method further comprising:
      sending a write command to the SSD, the write command being a predefined write command which is expanded by adding an immediate scrubbing flag to cause the SSD to invoke a backstage garbage collection program according to the predefined write command, in order to immediately delete the data on garbage blocks corresponding to logical block addresses of the target file, wherein when the delete request for the target file is detected, but before the step of examining a security property of the target file, the method further comprising:
    setting the security property of the target file to the secret classified property; and
    storing the target file to the SSD,
    wherein storing the target file further comprising:
        changing the security property of the target file to the secret classified property;
        controlling the SSD to locate the garbage blocks which existed before the target file is changed to include the secret classified property; and
        controlling the SSD to invoke the backstage garbage collection program to immediately scrub the garbage blocks for satisfying a preset immediate scrubbing condition;
wherein when a write operation to the target file is detected, the data is stored to the SSD according to the predefined write command;
wherein invocation of the backstage garbage collection program comprising:
    traversing, according to current logical block addresses of the target file, reverse-mapping tables corresponding to all the garbage blocks to determine if the garbage blocks satisfying the preset immediate scrubbing condition; and
    invoking the backstage garbage collection program to immediately scrub the garbage blocks that have been determined as satisfying the preset immediate scrubbing condition.

2. The method according to claim 1,
wherein the storing of the target file further comprising:
setting, for a logical disk having a security property that indicates the secret classified property, the write command corresponding to the logical disk having the secret classified property as the predefined write command; and
storing the target file on the logical disk with the secret classified property of security property, so that the target file has the security property that indicates that the target file includes the secret classified property.

3. The method according to claim 1, wherein the reverse-mapping tables corresponding to all the garbage blocks maintain reverse mappings to the logical block addresses of the physical addresses of the garbage blocks as they are data blocks; and
    wherein every reverse-mapping table corresponding to each garbage block is maintained in a last page of the garbage block, or the reverse-mapping tables corresponding to all the garbage blocks stored in a reserved data region.

4. The method according to claim 1, wherein when the SSD invokes the backstage garbage collection program according to the predefined write command to immediately locate the garbage blocks storing duplicate data of the target file and delete the data on the garbage blocks, the method further comprises:
    parsing, by the SSD, the write command corresponding to the target file;
    if the write command comprises the immediate scrubbing flag that is set, invoking, by the SSD the backstage garbage collection program according to the predefined write command to immediately locate the garbage blocks that store duplicate data of the target file and delete the data on the garbage blocks.

5. The method according to claim 4, wherein the predefined write command is one of:
    the write command, which is expanded with the immediate scrubbing flag using an obsolete/reserved bit in a write command of the ATA command set;
    the write command, which is expanded with the immediate scrubbing flag using an obsolete/reserved bit in a write command of the SCSI command set; and
    the write command, which is expanded with the immediate scrubbing flag using a reserved bit in a write command of the NVMHCI command set.

6. A data deleting apparatus, comprising:
a property determining module in a relevant hardware, configured to detect a delete request for a target file from a file system, and examine a security property of the target file, wherein the security property of the file indicates whether the target file includes secret classified property;
a deleting module in the relevant hardware, configured to determine whether the target file includes the secret classified property detected by the property determining module, and execute an overwrite operation on the target file and then execute a delete operation to delete the target file;
a property setting changing module in the relevant hardware, configured to change the security property of the target file to indicated that the target file includes the secret classified property; and
a storage control module in the relevant hardware, configured to store the target file on the SSD;
wherein during the overwrite operation, the deleting module is further configured to send a write command to a solid state disk (SSD), the write command being a predefined write command, which is expanded by adding an immediate scrubbing flag to cause the SSD to invoke a backstage garbage collection program according to the predefined write command to immediately delete data on garbage blocks corresponding to logical block addresses of the target file;
wherein the storage control module is further configured to control the SSD to locate the garbage blocks existing before the security property of the target file is changed to the secret classified property, and control the SSD to invoke the backstage garbage collection program to immediately scrub the garbage blocks for satisfying a preset immediate scrubbing condition;
wherein during invocation of the backstage garbage collection, the storage control module is further configured to:
traverse, according to current logical block addresses of the target file, reverse-mapping tables corresponding to all the garbage blocks to determine the garbage blocks satisfying the preset immediate scrubbing condition; and
invoke the backstage garbage collection program to immediately scrub the garbage blocks that have been determined as satisfying the preset immediate scrubbing condition.

7. The apparatus according to claim 6, further comprising:
a property setting module in the relevant hardware, configured to set the security property of the target file to indicated that the target file includes the secret classified property.

8. The apparatus according to claim 6, further comprising:
a logical disk setting module in the relevant hardware, configured to set the security property of the logical disk to indicate that the logical disk stores having the security property secret classified property, wherein the predefined write command corresponds to the write command for writing to the logical disk that stores the classified secret; wherein the storage control module is further configured to store the target file on the logical disk having the security property that indicates storage of the secret classified property according to the predefined write command, and set the immediate scrubbing flag in the predefined write command, so that the target file has a security property that indicates that the target file includes the secret classified property.

9. The apparatus according to claim 6, wherein the storage control module is further configured to store the data to the SSD according to the predefined write command when the write operation to the target file is detected.

* * * * *